United States Patent [19]

Fitzgerald, Jr. et al.

[11] 4,408,829
[45] Oct. 11, 1983

[54] FIBER OPTIC TRANSDUCERS

[75] Inventors: Robert W. Fitzgerald, Jr.; Robert L. Hall; Gary P. Bickford, all of Houston, Tex.

[73] Assignee: Schlumberger Technology Corporation, Houston, Tex.

[21] Appl. No.: 229,823

[22] Filed: Jan. 30, 1981

[51] Int. Cl.[3] .............................................. G02B 5/172
[52] U.S. Cl. .................................. 350/96.29; 250/227; 350/96.13
[58] Field of Search ................. 350/96.1, 96.11, 96.12, 350/96.13, 96.14, 96.15, 96.16, 96.2, 96.29, 356, 6.2; 358/901; 250/227; 455/608–612, 618; 367/141, 149, 171, 172, 174, 175

[56] References Cited

U.S. PATENT DOCUMENTS

| | | | |
|---|---|---|---|
| 3,625,589 | 12/1971 | Snitzer | 350/96.29 |
| 4,068,191 | 1/1978 | Zemon et al. | 350/96.13 |
| 4,086,484 | 4/1978 | Steensma | 350/96.10 X |
| 4,128,299 | 12/1978 | Maher | 350/96.13 |
| 4,142,774 | 3/1979 | Wright | 350/96.12 |
| 4,162,397 | 7/1979 | Bucaro et al. | 358/901 X |
| 4,235,113 | 11/1980 | Carome | 350/96.29 X |
| 4,238,856 | 12/1980 | Bucaro et al. | 350/96.13 |
| 4,294,513 | 10/1981 | Nelson et al. | 350/96.29 |

OTHER PUBLICATIONS

Fields et al. "Fiber Microbend Acoustic Sensor", Applied Optics, Oct. 1, 1980, vol. 19, No. 19; pp. 3265–3267.
Fields et al., (Abstract) "WD3 Multimode Optical Fiber Loss Modulation Acoustic Sensor", Optical Fiber Communication, Optical Society of America, c/o 1979, pp. 58–59.

*Primary Examiner*—Marvin L. Nussbaum

[57] ABSTRACT

Method and apparatus for detecting and converting pressure signals to modulated light signals by microbending optical fibers as a function of the pressure signals. Transducers are described which include a length of multimode optical fiber supported at spaced points across a flexible diaphragm. Movement of the diaphragm in response to the pressure signals microbends the optical fiber to induce attenuation of light travelling along the fiber as a function of the signals.

6 Claims, 3 Drawing Figures

FIBER OPTIC TRANSDUCERS

BACKGROUND OF INVENTION

1. Field of Invention

The present invention relates in general to transducers for converting pressure energy signals such as acoustic signals to electromagnetic energy signals as represented by light energy in order to take advantage of the avoidance of electrical power to effect the conversion.

2. The Prior Art

During the past several years considerable effort has gone into the development of optical sensors compatible with the present fiber-optics communications technology. In particular sensors that do not require power to convert acoustic signals into corresponding optical modulation are deemed highly desirable from the standpoint of reliability.

The development effort is evidenced by a modulator described in U.S. Pat. No. 4,086,484 to Steensma. There the modulator comprises an optical fiber clamped to a piezoelectric crystal. Acoustic signals interact with the fiber to change its index of refraction. As a result light is scattered out of the fiber and the beam of light attenuated as a function of the acoustic wave.

U.S. Pat. No. 4,142,774 to Wright proposes a transducer comprising an optical waveguide. Flexure of the transducer introduces strain patterns in the waveguide to produce diffraction and vary the characteristics of the light transmitted through the waveguide. In one embodiment the transducer is coupled at opposite ends to optical fibers.

SUMMARY OF THE INVENTION

According to the invention there is provided an optical transducer comprising a length of multimode optical fiber and means for microbending the fiber to vary the transmission mode characteristics of the fiber.

In one embodiment there is provided a housing having an open end across which is stretched a flexible diaphragm which is subject to displacement as a function of force applied thereto. A length of multimode optical fiber is mounted relative to the diaphragm such that diaplacement of the diaphragm effects microbending of the fiber at at least one point to vary the transmission mode characteristics of the fiber.

In addition, and further in accordance with the invention, there is described a modification whereby the diaphragm is driven or displaced at a predetermined frequency to effect a carrier signal modulated by displacement of diaphragm in response to external pressure signals. Employment of a multiplicity of such transducers each driven by a different frequency enables the sensing of pressure waves or signals at spaced points along a single optical fiber and the eventual demodulation of the complex signal.

DETAILED DESCRIPTION

Figure 1:
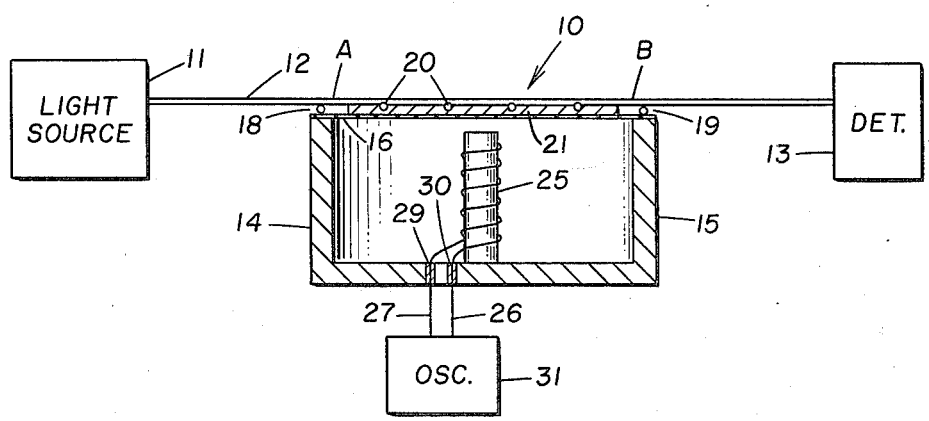
FIG. 1 illustrates a system including a transducer constructed in accordance with the present invention.

Referring now to FIG. 1 there is shown a system including a transducer 10 constructed in accordance with the principles of the present invention and further including a light source 11 which may be of the monochromatic variety but preferably is provided by a suitable LED source. A length of multimode optical fiber 12 is coupled at one end to the output of the light source 11. Light travelling along the optical fiber is modulated by the transducer 10 and the modulated light signal detected by detector 13. The transducer 10 is comprised of a housing 14 shown in cross section and having a cylindrical configuration. An air tight space 15 is provided by securing a flexible diaphragm 16 across the open end of the housing 14. The flexible diaphragm 16, selected from a class of materials consistent with the deflection needed vs. pressure to be detected, is fixed in place by suitable bonding agents such as epoxy.

The optical fiber 12 is mounted across the diaphragm such that displacement of the diaphragm effects microbending at at least two points, A and B of the optical fiber. While the optical fiber may be attached immediately adjacent the diaphragm 16, in the embodiment shown there is provided a rigid plate 21 preferably ferrous metal mounted atop the diaphragm and secured thereto. The plate 21, centrally located of the diaphragm is possessed of dimensions smaller than the diaphragm to provide opposite spaces at which maximum flexure of the diaphragm occurs in order to induce the microbending in the optical fiber at points A and B. The optical fiber is bonded to the housing at points 18 and 19 and to the plate 21 at a multiplicity of points 20.

The transducer can be utilized in seismec exploration as a hydrophone or a geophone. As a hydrophone the transducer would be employed to detect acoustic pressure changes in the surrounding media which in this instance would be water. The acoustic waves transmitted through the water would impinge on the flexible diaphragm thereby microbending the optical fiber and causing an attenuation change in the light travelling along the fiber. The transducer could be employed as a geophone by increasing the effective mass of the diaphragm for example by increasing the weight of the plate 21. In such configuration acoustic waves travelling through the earth would impinge upon the housing 14, the housing would move in response to such pressure changes while the mass of the diaphragm plate combination would remain relatively stationary. This would effect microbending of the optical fiber and a resulting attenuation change in the light being transmitted along the length of the optical fiber 12. Accordingly, the transducer of the present invention has application wherever changes in force or pressure are to be sensed.

The advantage of microbending which is the equivalent of a loss-modulation transducer over other techniques such as interferometric methods lies in the fact that the interaction with acoustic or pressure waves is localized. Such a transducer is also less susceptible to changes in a water environment than those employing the phase-interferometric method.

In one embodiment of the transducer 10, the housing 14 was constructed of aluminum. The optical fiber 12 was a multimode fiber having a grade index (parabolic profile) characteristic. This type of optical fiber is available from a number of sources including IT&T. The plate 21 can be a thin structure formed of rust-resistant metal such as Alnico.

The transducer 10 may be modified as shown in FIG. 1 to provide the function of an analog modulator. In this particular mode there would be added an electromagnet 25 the coil of which would be connected by way of conductors 26 and 27 to a suitable oscillator 31. The conductors 26 and 27 would pass through the base of the housing by way of feed-through terminals 29 and 30. The application of an analog electrical signal from the output of the oscillator 31 to the coil of the electromagnet 25 would deflect the ferrous metal plate 21 to effect displacement of the diaphragm to induce microbending of the optical fiber 12 at points A and B in manner proportional to the applied electrical signal. The transducer can also be used as a digital modulator by applying a two or three DC level coded electrical signal to the coil of the electromagnet 25 thereby producing a two or three state attenuation change in the optical fiber. By using more than one transducer operating at different oscillator frequencies higher than the frequency of the information signals, analog or digital signals can be multiplexed on a single fiber. The modulation technique would be a matter of choice and would include but not be necessarily limited to amplitude, frequency, pulse code etc.

Figure 2:
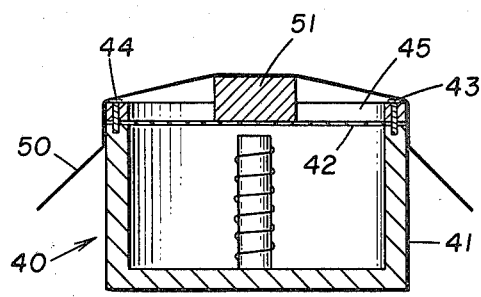
FIG. 2 illustrates a preferred embodiment of the transducer including design features providing increased sensitivity.

In FIG. 2 there is illustrated a preferred embodiment of the transducer which provides greater sensitivity to pressure waves. The transducer 40 of FIG. 2 includes a housing 41 similar to that of housing 14 of FIG. 1. The open end of the housing is covered by a diaphragm 42 secured across the open end of the housing 41 by a ring 45 secured to the main body of the housing by way of a plurality of machine screws, only two of which 43 and 44 are shown.

A length of optical fiber 50 is bonded at diametrically opposite portions of the housing 41 with the central portion of the fiber extending across a rigid structure 51. In this embodiment the length of the rigid structure 51 is considerably less than the diameter of the diaphragm 42. This enables greater flexure of the diaphragm and renders it more sensitive to impinging pressure waves or forces applied thereto.

Figure 3:
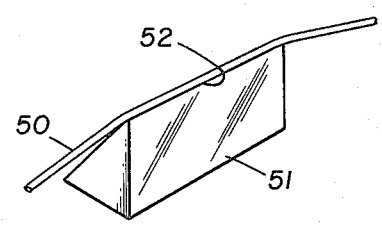
FIG. 3 is a three dimensional illustration of rigid structure for supporting the optical fiber in the embodiment of FIG. 2.

As illustrated in FIG. 3 the rigid structure 51 is comprised of a length of material having a triangular cross section with a groove 52 cut at its apex and across its entire length for receiving and supporting a length of the optical fiber 50. The optical fiber is bonded to the structure 51 by materials such as epoxy or other bonding agents.

Returning again to FIG. 2 the transducer 40 may be modified like the transducer 10 of FIG. 1 in order to provide the function of a modulator. In order to reduce redundancy it is believed necessary only to illustrate the electromagnet with the understanding that structural changes like those in FIG. 1 would be made to the housing 41 in order that conductors pass therethrough for connection to a suitable signal generator. Where the transducer is to include an electromagnet the rigid structure 51 will preferably be comprised of a rust resistant metal subject to attraction by an electromagnetic field.

Now that the principles of the invention have been described, modifications will be obvious to those skilled in the art and are intended to be within the scope of the following claims.

What is claimed is:

1. An optical transducer comprising a housing having an open end, a flexible diaphragm stretched across said open end and secured to said housing so as to be subject to displacement upon application of a force thereto,
   a length of multimode optical fiber,
   means for mounting said fiber relative to said diaphragm such that displacement of said diaphragm effects microbending at at least one point along said fiber to vary the transmission mode characteristics of said fiber as a function of the force, wherein said mounting means includes a rigid member secured to one surface of said diaphragm being concentric therewith and having an area less than the area of said diaphragm.

2. An optical transducer as in claim 1 wherein said member is comprised of metal and wherein an electromagnetic-field generator is mounted in said housing to apply a vibratory force to said diaphragm by way of said metal member to effect microbending of said fiber at at least two spaced points.

3. An optical transducer as in claim 1 wherein said optical fiber is mounted along the said rigid member and spaced from the surface of said diaphragm.

4. An optical transducer as in claim 2 wherein there is provided means connected to said generator for modulating said vibratory force.

5. An optical transducer comprising a housing having an open end, a flexible diaphragm stretched across said open end and secured to said housing so as to be subject to displacement upon application of a force thereto,
   a length of multimode optical fiber,
   means for mounting said fiber relative to said diaphragm such that displacement of said diaphragm effects microbending at at least one point along said fiber to vary the transmission mode characteristics of said fiber as a function of the force, wherein said mounting means comprises a rigid structure secured to and centrally located of said diaphragm, said structure having a linear surface extending above said diaphragm, said fiber being secured along said linear surface with opposite portions extending free of said diaphragm surface adjacent terminal portions of said structure such that displacement of said diaphragm effects microbending of said fiber at the terminal portions of said structure.

6. A method of modulating a light beam as a function of pressure signals comprising the steps of
   passing light along a length of multimode optical fiber mounted relative to a diaphragm such that displacement of the diaphragm effects microbending of the fiber at at least one point along its length to proportionally attenuate the light passing along the fiber,
   displacing the diaphragm as a function of the pressure signals, and
   inducing additional microbending of the fiber is induced at a predetermined frequency higher than the frequencies of the pressure signals to produce a composite signal.

* * * * *